(12) United States Patent
Shao (10) Patent No.: US 9,880,668 B2
(45) Date of Patent: Jan. 30, 2018

(54) METHOD FOR IDENTIFYING INPUT INFORMATION, APPARATUS FOR IDENTIFYING INPUT INFORMATION AND ELECTRONIC DEVICE

(71) Applicants: Beijing Lenovo Software Ltd., Beijing (CN); Lenovo (Beijing) Co., Ltd., Beijing (CN)

(72) Inventor: Xiang Shao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 361 days.

(21) Appl. No.: 14/229,861

(22) Filed: Mar. 29, 2014

(65) Prior Publication Data

US 2015/0070322 A1    Mar. 12, 2015

(30) Foreign Application Priority Data

Sep. 11, 2013    (CN) .......................... 2013 1 0412627

(51) Int. Cl.
G06F 3/042    (2006.01)
G06F 3/0488    (2013.01)

(52) U.S. Cl.
CPC ........ G06F 3/0421 (2013.01); G06F 3/04883 (2013.01)

(58) Field of Classification Search
None
See application file for complete search history.

(56) References Cited

U.S. PATENT DOCUMENTS

| | | |
|---|---|---|
| 7,629,967 B2 | 12/2009 | Newton |
| 8,289,299 B2 | 10/2012 | Newton |
| 8,456,447 B2 | 6/2013 | Newton |
| 8,466,885 B2 | 6/2013 | Newton |

(Continued)

FOREIGN PATENT DOCUMENTS

| | | |
|---|---|---|
| CN | 1774692 A | 5/2006 |
| CN | 102012768 A | 4/2011 |

(Continued)

OTHER PUBLICATIONS

First Chinese Office Action regarding Application No. 201310412627.3 dated Dec. 5, 2016. English translation provided by Unitalen Attorneys at Law.

*Primary Examiner* — Ifedayo Iluyomade
(74) *Attorney, Agent, or Firm* — Harness, Dickey & Pierce, P.L.C.

(57) ABSTRACT

A method for identifying input information, an apparatus for identifying input information and an electronic device are provided. The method for identifying input information is applied to an electronic device. The electronic device includes a first panel and a second panel, and further includes a collimated light generator arranged on the first panel and two or more optical detection devices arranged on the first panel. In the method, firstly an information input operation is acquired; then a variation of shadow of the information input operation blocking collimated light beams generated by the collimated light generator is acquired via the optical detection device; and the input information corresponding to the information input operation is acquired according to the variation of shadow.

9 Claims, 6 Drawing Sheets

(56) References Cited

U.S. PATENT DOCUMENTS

| | | |
|---|---|---|
| 8,508,508 B2 | 8/2013 | Newton |
| 2005/0190162 A1 | 9/2005 | Newton |
| 2010/0007622 A1 | 1/2010 | Juni |
| 2010/0085330 A1* | 4/2010 | Newton ............... G06F 3/0425 345/175 |
| 2010/0090985 A1 | 4/2010 | Newton |
| 2010/0097353 A1 | 4/2010 | Newton |
| 2010/0103143 A1 | 4/2010 | Newton et al. |
| 2010/0207911 A1 | 8/2010 | Newton |
| 2010/0229090 A1* | 9/2010 | Newton ............... G06F 3/0428 715/702 |
| 2011/0205151 A1 | 8/2011 | Newton et al. |
| 2011/0205155 A1 | 8/2011 | Newton et al. |
| 2011/0205185 A1 | 8/2011 | Newton et al. |
| 2011/0205186 A1* | 8/2011 | Newton ............... G06F 3/011 345/175 |
| 2013/0170185 A1 | 7/2013 | You |

FOREIGN PATENT DOCUMENTS

| | | |
|---|---|---|
| CN | 201853211 U | 6/2011 |
| CN | 102346626 A | 2/2012 |
| CN | 102750048 A | 10/2012 |
| CN | 102754047 A | 10/2012 |
| WO | WO-2004072843 A1 | 8/2004 |

\* cited by examiner

METHOD FOR IDENTIFYING INPUT INFORMATION, APPARATUS FOR IDENTIFYING INPUT INFORMATION AND ELECTRONIC DEVICE

This application claims the priority to Chinese Patent Application No. 201310412627.3, entitled "METHOD FOR IDENTIFYING INPUT INFORMATION, APPARATUS FOR IDENTIFYING INPUT INFORMATION AND ELECTRONIC DEVICE", filed with the Chinese Patent Office on Sep. 11, 2013, which is incorporated by reference in its entirety herein.

FIELD

The disclosure relates to the field of electronic technology, and in particular to a method for identifying input information, an apparatus for identifying input information and an electronic device.

BACKGROUND

For the convenience of a usage of a user, some of the existing electronic devices are provided with an information input device. For example, a computer is provided with a keyboard, and information input by the user is acquired by acquiring an operation of the user to the button.

However, in the existing electronic device a capacitive touch screen needs to be provided to identify information input by the user. When the user performs an operation to the capacitive touch screen, input information is identified by collecting coordinates for the operation relative to the capacitive touch screen. However, the capacitive touch screen is expensive, thereby resulting in a high manufacturing cost of the electronic device.

SUMMARY

In view of this, an object of the disclosure is to provide a method for identifying input information, an apparatus for identifying input information and an electronic device so as to solve a problem of the high manufacturing cost of the electronic device in the existing technology. The specific implementing solution is as follows.

A method for identifying input information is provided, which is applied to an electronic device, where the electronic device includes a first panel and a second panel, and the electronic device further includes a collimated light generator arranged on the first panel and two or more optical detection devices arranged on the first panel, the method for identifying input information includes:

acquiring an information input operation;

acquiring, via the optical detection devices, a variation of shadow of the information input operation blocking collimated light beams generated by the collimated light generator; and acquiring, according to the variation of shadow, the input information corresponding to the information input operation.

Preferably, the second panel of the electronic device is a touch panel and the information input operation is performed on the touch panel, the acquiring, according to the variation of shadow, input information corresponding to the information input operation includes:

determining coordinates of the information input operation relative to the touch panel according to the variation of shadow of the information input operation blocking the collimated light beams, after the variation of shadow is acquired; and acquiring the input information corresponding to the information input operation according to the coordinates of the information input operation relative to the touch panel.

Preferably, the information input operation is a gesture operation, and the acquiring, according to the variation of shadow, input information corresponding to the information input operation includes:

determining a gesture corresponding to the information input operation, according to the variation of shadow of the information input operation blocking the collimated light beams, after the variation of shadow is acquired; and acquiring, according to the gesture corresponding to the information input operation, the input information corresponding to the information input operation.

Preferably, the method for identifying input information further includes:

acquiring an angle between the first panel and the second panel; and adjusting an emergence angle of the collimated light beams generated by the collimated light generator, according to the angle generated between the first panel and the second panel.

Accordingly, an apparatus for identifying input information is provided, which is applied to an electronic device, where the electronic device includes a first panel and a second panel, and the electronic device further includes a collimated light generator arranged on the electronic device and two or more optical detection devices arranged on the first panel, the apparatus for identifying input information includes:

an acquisition module configured to acquire an information input operation;

a detection module configured to acquire, via the optical detection devices, a variation of shadow of the information input operation blocking collimated light beams generated by the collimated light generator; and an information acquisition module configured to acquire, according to the variation of shadow, the input information corresponding to the information input operation.

Preferably, the second panel of the electronic device is a touch panel and the information input operation is performed on the touch panel, the information acquisition module includes:

a first determining unit configured to determine coordinates of the information input operation relative to the touch panel according to the variation of shadow of the information input operation blocking collimated light beams, after the variation of shadow is acquired; and a first acquisition unit configured to acquire the input information corresponding to the information input operation according to the coordinates of the information input operation relative to the touch panel.

Preferably, the information input operation is a gesture operation, and the information acquisition module includes:

a second determining unit configured to determine a gesture corresponding to the information input operation, according to the variation of shadow of the information input operation blocking the collimated light beams, after the variation of shadow is acquired; and a second acquisition unit configured to acquire, according to the gesture corresponding to the information input operation, the input information corresponding to the information input operation.

Preferably, the apparatus for identifying input information further includes:

an angle acquisition module configured to acquire an angle between the first panel and the second panel; and an adjusting module configured to adjust an emergence angle of the collimated light beams generated by the collimated light generator, according to the angle between the first panel and the second panel.

Accordingly, an electronic device is provided, where the electronic device includes a first panel and a second panel, and the electronic device further includes a collimated light generator arranged on the electronic device and two or more optical detection devices arranged on the electronic device; and the apparatus for identifying input information described above is integrated in a processor of the electronic device.

The method for identifying input information disclosed by the disclosure is applied to an electronic device. The electronic device includes a first panel and a second panel, and the electronic device further includes a collimated light beams generator arranged on the electronic device and two or more optical detection devices arranged on the first panel. In the method, firstly an information input operation is acquired; then a variation of shadow of the information input operation blocking collimated light beams generated by the collimated light beams generator is acquired via the optical detection device; and input information corresponding to the information input operation is acquired according to the variation of shadow.

According to the method for identifying input information, the electronic device, including a collimated light generator and two or more optical detection devices rather than the capacitive touch screen, may identify input information. Compared with the capacitive touch screen in the existing technology, the cost is low, thereby reducing the manufacturing cost of the electronic device.

BRIEF DESCRIPTION OF THE DRAWINGS

In order to illustrate the technical solutions according to the embodiments of the disclosure or the conventional technology more clearly, hereinafter the accompanying drawings for the description of the embodiments or the conventional technology are simply introduced. Obviously, the accompanying drawings described below are only some embodiments of the disclosure, those skilled in the art may obtain other accompanying drawings according to these accompanying drawings without any creative work.

DETAILED DESCRIPTION

The technical solutions in the embodiments of the disclosure will be described clearly and completely in conjunction with the accompanying drawings in the embodiment of the disclosure. Obviously, the described embodiments are only some of the embodiments, not all the embodiments. All of the other embodiments obtained by those skilled in the art without any creative work based on the embodiments of the disclosure fall within the scope of protection of the disclosure.

Figure 1:
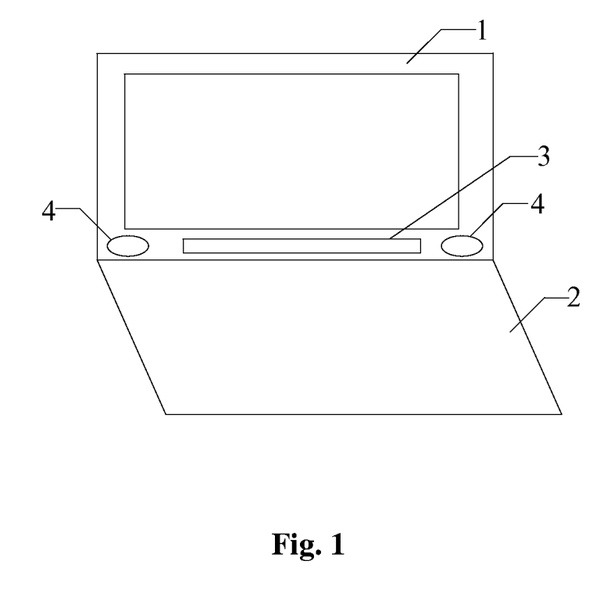
FIG. 1 is a schematic structural diagram of an electronic device in the conventional technology.

In order to solve a problem in the conventional technology that an electronic device needs to be provided with a capacitive touch screen, thereby resulting in a high manufacturing cost. A method for identifying input information, an apparatus for identifying input information and an electronic device are provided according to embodiments of the disclosure. The method for identifying input information and the apparatus for identifying input information are applied to an electronic device. FIG. 1 shows a schematic structural diagram of the electronic device. Referring to FIG. 1, the electronic device includes a first panel 1 and a second panel 2, and the electronic device further includes a collimated light generator 3 arranged on the first panel 1 and two or more optical detection devices 4 arranged on the first panel 1.

The electronic device may be a flip phone or a notebook computer, which will not be limited by the disclosure. In the case that the electronic device is a notebook computer, the first panel of the electronic device is generally a display screen. In addition, when a lower portion of the first panel is connected with the second panel, the collimated light generator and the optical detection device are generally arranged at the lower portion of the first panel.

A method for identifying input information, an apparatus for identifying input information and an electronic device according to the disclosure are respectively introduced according to the following embodiments.

First Embodiment

Figure 2:
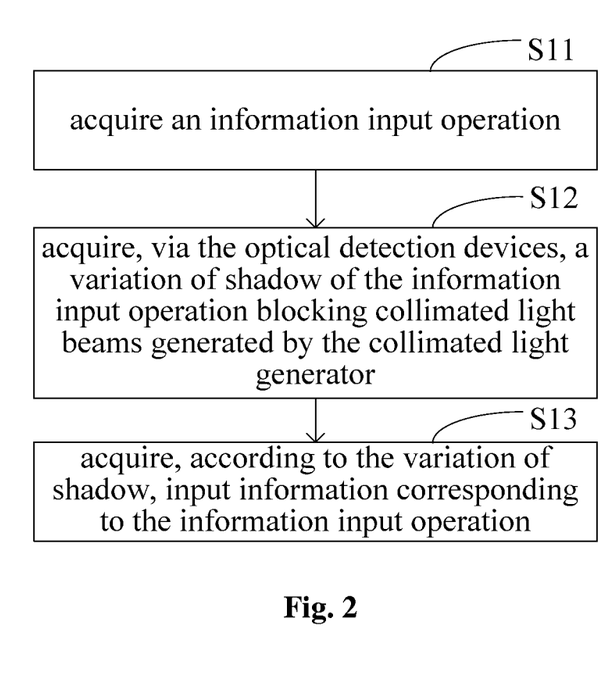
FIG. 2 is a schematic flow chart for a method for identifying input information according to an embodiment of the disclosure.

A method for identifying input information is provided, which is applied to an electronic device. The electronic device includes a first panel and a second panel, and the electronic device further includes a collimated light generator arranged on the first panel and two or more optical detection devices arranged on the first panel. FIG. 2 shows a schematic flow chart of the method for identifying input information. Referring to FIG. 2, the method for identifying input information includes steps S11-S13.

Step S11, acquiring an information input operation.

Step S12, acquiring, via the optical detection devices, a variation of shadow of the information input operation blocking collimated light beams generated by the collimated light generator.

The collimated light generator arranged on the first panel of the electronic device is adapted to generate collimated light beams. The information input operation performed by the user includes a touch operation and a gesture operation. When the user performs information input operation to be acquired by the electronic device, the collimated light beams will be blocked by the information input operation to generate the variation of shadow. The optical detection devices may detect the variation of shadow.

The optical detection device is generally a camera. The camera is adapted to collect an image around the electronic device. After acquiring the image, the electronic device acquires the variation of shadow of the information input operation blocking the collimated light beams generated by the collimated light generator, according to the image.

Alternatively, the optical detection device may also be other optical sensors, which will not be limited herein.

Step S13, acquiring, according to the variation of shadow, input information corresponding to the information input operation.

The method for identifying input information according to the disclosure is applied to an electronic device. The electronic device includes a first panel and a second panel, and the electronic device also includes a collimated light generator arranged on the first panel and two or more optical detection devices arranged on the first panel. In the method, firstly an information input operation is acquired; then a variation of shadow of the information input operation blocking the collimated light beams generated by the collimated light generator is acquired via the optical detection device; and input information corresponding to the information input operation is acquired according to the variation of shadow.

According to the method for identifying input information, the electronic device, including a collimated light generator and two or more optical detection devices rather than the capacitive touch screen, may identify input information. Compared with the capacitive touch screen in the existing technology, the cost is low, thereby reducing the manufacturing cost of the electronic device.

Second Embodiment

The user may input information to the electronic device by various ways. In the case that the second panel of the electronic device is a touch panel and the information input operation is performed on the touch panel, referring to a schematic flow chart shown in FIG. 3, a method for identifying input information according to the disclosure includes steps S21-S24.

Figure 3:
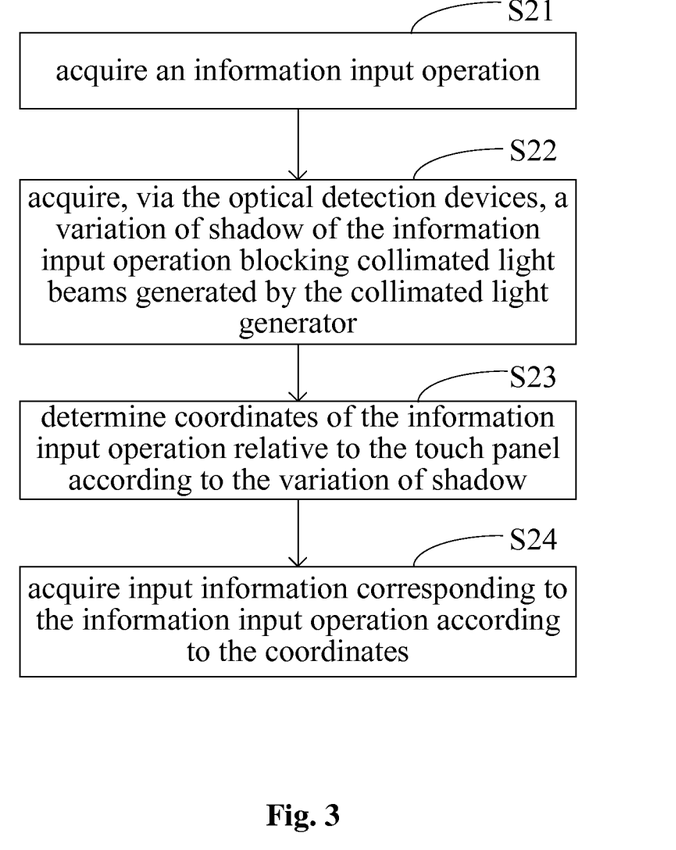
FIG. 3 is a schematic flow chart for another method for identifying input information according to an embodiment of the disclosure.

Step S21, acquiring an information input operation.

Step S22, acquiring, via the optical detection devices, a variation of shadow of the information input operation blocking collimated light beams generated by the collimated light generator.

The operating processes of step S21 to step S22 is the same as the operating processes of step S11 to step S12 in the first embodiment, which may be referred to each other and will not be described here.

Step 23, determining coordinates of the information input operation relative to the touch panel according to the variation of shadow of the information input operation blocking collimated light beams, after the variation of shadow is acquired.

Step S24, acquiring input information corresponding to the information input operation according to the coordinates of the information input operation relative to the touch panel.

According to a solution of Step S23 and Step S24, input information corresponding to the information input operation is acquired according to a variation of shadow of the information input operation blocking the collimated light beams. According to the solution, by utilizing optical touch locating principle, a button position corresponding to the input locating information is determined based on the variation of shadow, and the matched button is determined according to the button position.

Figure 4:
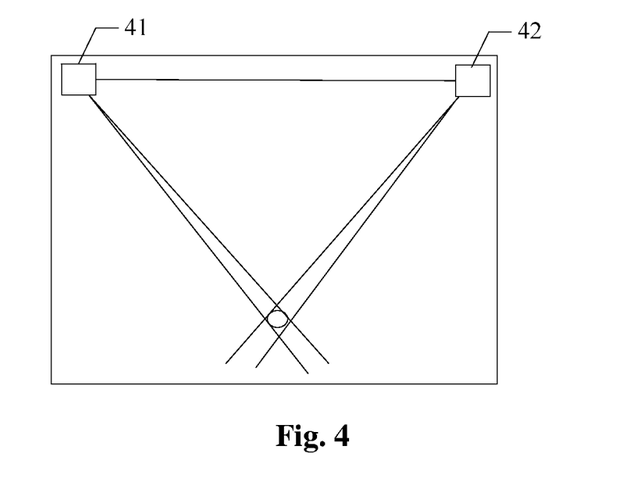
FIG. 4 is a schematic diagram of a touch panel according to an embodiment of the disclosure.

FIG. 4 shows a schematic diagram of a touch panel when an information input operation is performed. The collimated light generator projects a collimated light beams. A finger of the user will place on the touch panel when a touch operation is performed to the touch panel. Due to a reflection of the finger to the collimated light beams, a light spot formed due to the reflection of the fingers appears within viewing angles of an optical detection device 41 and an optical detection device 42. Both of the two optical detection devices arranged in the electronic device may sense the position of the light spot. The electronic device obtains position information of the finger according to the position of the light spot transmitted by the two optical detection devices, by utilizing principle of triangulation.

According to the method for identifying input information according to the second embodiment of the disclosure, when the touch operation of the user to the touch panel is received, the position of the finger of the user on the touch panel is acquired according to the variation of shadow; and the matched button is determined according to the position, thereby identifying the input information. In the solution, the electronic device is only provided with an optical detection device and an optical generator, and the cost of the optical detection device and the optical generator is low, thereby efficiently reducing the manufacturing cost of the electronic device.

Third Embodiment

The user may input information to the electronic device by various ways. In the case that the information input operation is a gesture operation, referring to a schematic flow chart shown in FIG. 5, a method for identifying input information according to the disclosure includes steps S31-S34.

Figure 5:
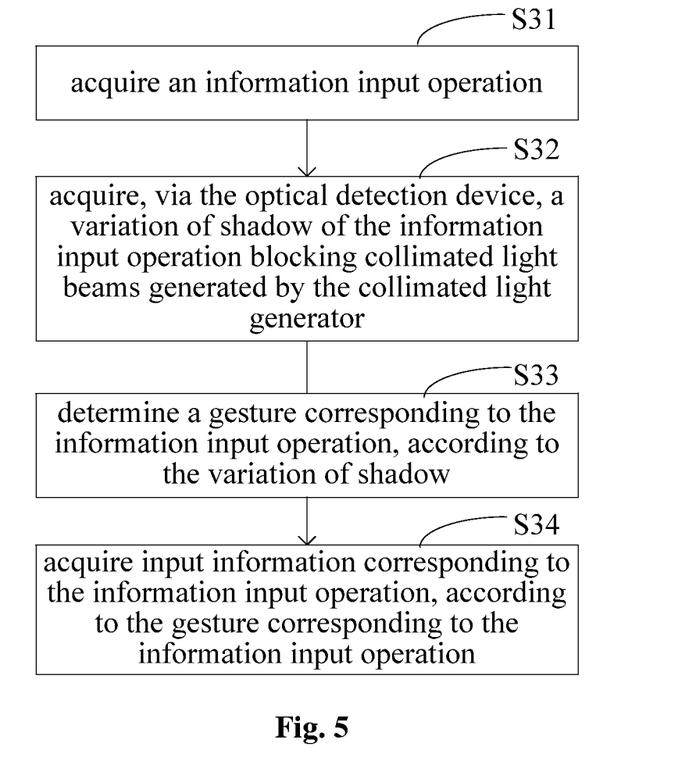
FIG. 5 is a schematic flow chart for another method for identifying input information according to an embodiment of the disclosure.

Step S31, acquiring an information input operation.

Step S32, acquiring, via the optical detection device, a variation of shadow of the information input operation blocking collimated light beams generated by the collimated light generator.

The operating processes of step S31 to step S32 is the same as the operating processes of step S11 to step S12 in the first embodiment, which may be referred to each other and will not be described here.

Step S33, determining a gesture corresponding to the information input operation, according to the variation of shadow of the information input operation blocking the collimated light beams.

Step S34, acquiring input information corresponding to the information input operation, according to the gesture corresponding to the information input operation.

For example, when the user faces the first panel of the electronic device and makes a sliding gesture from left to right; the collimated light beams generated by the collimated light generator will be reflected, the optical detection device will transmit an image generated by the gesture operation process to a processor of the electronic device. Thus, the electronic device can determine the gesture of the operation according to the variation of shadow during the gesture operation. Subsequently, the electronic device may determine input information corresponding to the information input operation according to the gesture corresponding to the information input operation.

According to a solution of Step S33 and step S34, input information corresponding to the information input operation is acquired according to the variation of shadow change of the information input operation blocking the collimated light beams. According to the solution, the gesture when the user performs an information input operation can be determined according to the variation of shadow, and input information corresponding to the information input operation is determined according to the gesture.

Input information input by a gesture operation of the user can be identified according to the method for identifying input information according to the third embodiment, and thereby the electronic device may also support the gesture operation.

Fourth Embodiment

A method for identifying input information according to the disclosure is applied to the electronic device. The electronic device is provided with a first panel and a second panel. The electronic device may have different shapes when different angles are generated between the first panel and the second panel.

Figure 6:
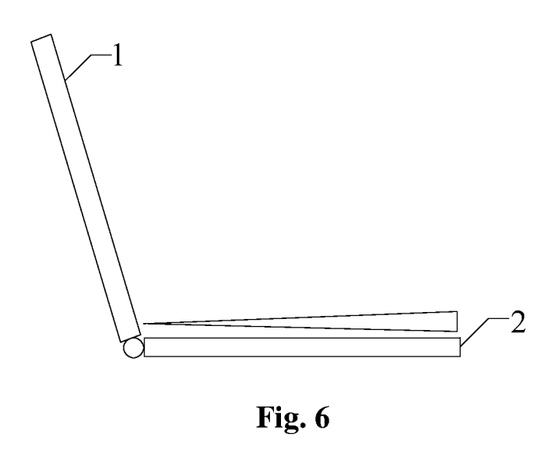
FIG. 6 is schematic structural diagram of an electronic device according to an embodiment of the disclosure.
Figure 7:
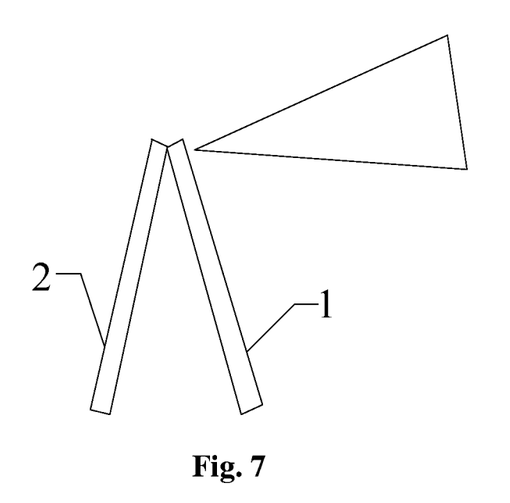
FIG. 7 is a schematic structural diagram of another electronic device according to an embodiment of the disclosure.

For example, the electronic device may be a rotatable notebook computer. FIG. 6 and FIG. 7 shows schematic structural diagrams of the electronic device. In FIG. 6, in the case that an angle between the first panel and the second panel of the electronic device ranges from 0 degree to 90 degrees, the electronic device is in a shape of notebook computer. In FIG. 7, in the case that the angle between the first panel and the second panel ranges from 90 degrees to 360 degrees, the electronic device is in a shape of tent.

Electronic devices in different shapes need different viewing angle ranges of the collimated light beams. Therefore, the method for identifying input information according to the application further includes:

acquiring, before an information input operation is acquired, an angle between the first panel and the second panel; and adjusting, according to the angle, an emergence angle of collimated light beams generated by the collimated light beams generator.

For example, referring to FIG. 6, in the case that the angle between the first panel and the second panel of the electronic device is small and the electronic device is in the shape of notebook computer, the adopted information input operation is generally achieved by touching the touch panel. In this case, collimated light beams, which are generated by the collimated light generator arranged on the first panel, only needs to be parallel with the second panel. In this case, an emergence angle of the collimated light beams generated by the collimated light generator may be adjusted such that the collimated light beams parallels with the second panel.

Referring to FIG. 7, in the case that the angle between the first panel and the second panel of the electronic device is large and the electronic device is in the shape of tent, a gesture operation is generally adopted. In this case, in order to capture the gesture operation, the collimated light beams generate by the collimated light generator are in a large range of angles.

Therefore, according to the fourth embodiment of the disclosure, the emergence angle of the collimated light beams generated by the collimated light generator is adjusted according to the shape of the electronic device. The electronic device obtains a high accuracy for identifying the input information, by adjusting the emergence angle of the collimated light generator.

Fifth Embodiment

According to the fifth embodiment of the disclosure, an apparatus for identifying input information is applied to an electronic device. The electronic device includes a first panel and a second panel, and the electronic device further includes a collimated light generator arranged on the first panel and two or more optical detection devices arranged on the first panel. Referring to a schematic structural diagram shown in FIG. 8, the apparatus for identifying input information includes an acquisition module 11, a detection module 12 and an information acquisition module 13.

Figure 8:
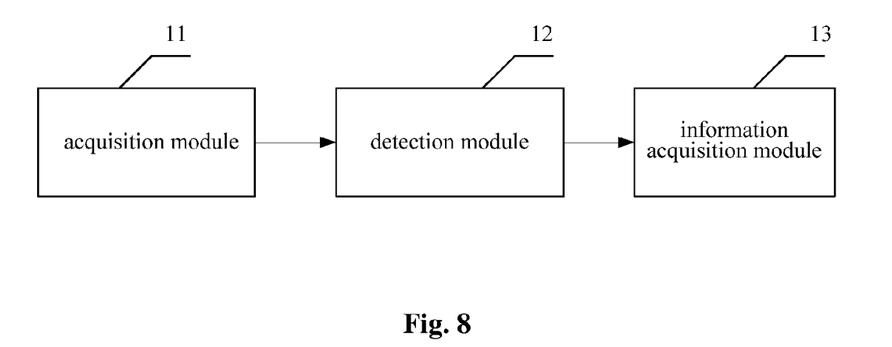
FIG. 8 is a schematic structural diagram of an apparatus for identifying input information according to an embodiment of the disclosure.

The acquisition module 11 is configured to acquire an information input operation.

The detection module 12 is configured to acquire, via the optical detection devices, a variation of shadow of the information input operation blocking collimated light beams generated by the collimated light generator.

The information acquisition module 13 is configured to acquire, according to the variation of shadow, input information corresponding to the information input operation.

The apparatus for identifying input information according to the disclosure is applied to an electronic device. The electronic device includes a first panel and a second panel, and further includes a collimated light generator arranged on the first panel and two or more optical detection devices arranged on the first panel. In the apparatus, firstly the information input operation is acquired; then the variation of shadow of the information input operation blocking collimated light beams generated by the collimated light generator is acquired via the optical detection devices; and finally the input information corresponding to the information input operation is acquired according to the variation of shadow.

According to the apparatus for identifying input information, the electronic device, including a collimated light generator and two or more optical detection devices rather than the capacitive touch screen, may identify the input information. Compared with the capacitive touch screen in the existing technology, the cost is low, thereby reducing the manufacturing cost of the electronic device.

Furthermore, the second panel of the electronic device may be a touch panel and the information input operation is performed on the touch panel, the information acquisition module 13 may includes: a first determining unit and a first acquisition unit.

The first determining unit is configured to determine coordinates of the information input operation relative to the touch panel, according to the variation of shadow of the information input operation blocking collimated light beams, after the variation of shadow is acquired.

The first acquisition unit is configured to acquire the input information corresponding to the information input operation according to the coordinates of the information input operation relative to the touch panel.

Furthermore, the information input operation may be a gesture operation, and the information acquisition module 13 includes: a second determining unit and a second acquisition unit.

The second determining unit is configured to determine a gesture corresponding to the information input operation, according to the variation of shadow of the information input operation blocking collimated light beams, after the variation of shadow is acquired.

The second acquisition unit is configured to acquire, according to the gesture corresponding to the information input operation, the input information corresponding to the information input operation.

In addition, the apparatus for identifying input information further includes: an angle acquisition module and an adjusting module.

The angle acquisition module is configured to acquire an angle between the first panel and the second panel.

The adjusting module is configured to adjust an emergence angle of collimated light beams generated by the collimated light generator, according to the angle between the first panel and the second panel.

Accordingly, an electronic device is provided according to the disclosure. The electronic device includes a first panel and a second panel, and the electronic device further includes a collimated light generator arranged on the first panel and two or more optical detection devices arranged on the first panel; and the apparatus for identifying input information described above is integrated in a processor of the electronic device.

Those skilled in the art may realize that the units and algorithm steps described in combination with the embodiments disclosed herein may be implemented by an electronic hardware or a combination of a computer software and an electronic hardware. Whether these functions being implemented by hardware or software depends on the specific application and the design constraints of the technical solutions. Those skilled in the art may use different methods to achieve the described function for each specific application, but this achievement should not be regarded as exceeding the scope of the disclosure.

Those skilled in the art may clearly know that the specific operation process for the system, the apparatus and the unit described above may refer to the corresponding process in the preceding method embodiment for convenience and conciseness of the description, which is not described here.

In the several embodiments provided by the disclosure, it should be understood that the disclosed system, apparatus and method may be implemented by other ways. For example, the apparatus embodiments described above are only illustrative. For example, the dividing of the units is only a dividing based on logical functions; in practice, there may be other dividing ways, for example, multiple units or assemblies may be combined together or integrated into another system, or some features may be ignored or not embodied. In another aspect, the displayed or discussed coupling between each other, the direct coupling or the communication connection may be an indirect coupling or communication connection via some interfaces, apparatus or units, may be electrical, mechanical or in other forms.

The units illustrated as separate components may be physically separated or not, the components displayed as a unit may be physical units or not, i.e., the components may be located at the same position, or may be distributed on multiple network units. Part or all of the units are selected to achieve the objects of the solutions of the embodiment according to the actual need.

In addition, respective functional units in each embodiment of the disclosure may be integrated in a processing unit, or respective units exist physically independently, or two or more units are integrated in a unit.

The function may be stored in a computer readable storage medium when the function is implemented by the software functional unit and sold or used as an independent product. Based on such understanding, the part of the disclosure which contributes to the existing technology or the part of the technical solutions may be embodied in the form of a software product, the computer software product is stored in a storage medium, and includes several instructions which enables a computer device (for example, a personal computer, a server or a network device) to perform all or part of the steps of the methods according to respective embodiments of the disclosure, The preceding storage medium includes respective mediums which may store program codes, such as a USB disc, a mobile hard disc, a Read Only Memory (ROM), a Random Access Memory (RAM), a magnetic disc or a compact disc.

According to the above illustration of the disclosed embodiments, those skilled in the art may implement or use the disclosure. Many variations to these embodiments are obvious for those skilled in the art, the general principle defined herein may be implemented in other embodiments without departing from the spirit or scope of the disclosure. Hence, the disclosure is not defined by these embodiments illustrated herein, but in accordance with the widest scope consistent with the principles and novel features disclosed herein.

The invention claimed is:

1. A method for identifying input information, applied to an electronic device, wherein the electronic device comprises a first panel and a second panel, the first panel comprises a display screen, a collimated light and two or more optical detection devices, the second panel is a touch panel, and the method for identifying input information comprises:

acquiring an information input operation;

acquiring, via the optical detection devices, a variation of shadow of the information input operation blocking collimated light beams generated by the collimated light generator;

acquiring an angle between the first panel and the second panel;

determining whether the angle between the first panel and the second panel is smaller than a threshold;

determining coordinates of the information input operation relative to the touch panel, according to the variation of shadow of the information input operation blocking the collimated light beams, after the variation of shadow is acquired, when the angle between the first panel and the second panel is smaller than the threshold; and acquiring, by the touch panel, the input information corresponding to the information input operation, according to the coordinates of the information input operation relative to the touch panel.

2. The method according to claim 1, wherein the information input operation is performed on the touch panel.

3. An apparatus for identifying input information, applied to an electronic device, wherein the electronic device comprises a first panel and a second panel, the first panel comprises a display screen, a collimated light generator and two or more optical detection devices, the second panel is a touch panel, the apparatus for identifying input information comprises a processor and a memory for storing program instructions, and the processor performs the program instructions to:

acquire an information input operation;

acquire, via the optical detection devices, a variation of shadow of the information input operation blocking collimated light beams generated by the collimated light generator; and acquire an angle between the first panel and the second panel;

determine whether the angle between the first panel and the second panel is smaller than a threshold;

determine coordinates of the information input operation relative to the touch panel, according to the variation of shadow of the information input operation blocking the collimated light beams, after the variation of shadow is acquired, when the angle between the first panel and the second panel is smaller than the threshold; and acquire, by the touch panel, the input information corresponding to the information input operation according to the coordinates of the information input operation relative to the touch panel.

4. The apparatus according to claim 3, wherein the information input operation is performed on the touch panel.

5. An electronic device, wherein the electronic device comprises a first panel and a second panel, the first panel comprises a display screen, a collimated light generator and two or more optical detection devices; the second panel is a touch panel, and an apparatus for identifying input information is integrated in a processor of the electronic device, and wherein the apparatus for identifying input information comprises program instructions, and the processor performs the program instructions to acquire an information input operation;

acquire, via the optical detection devices, a variation of shadow of the information input operation blocking collimated light beams generated by the collimated light generator; and acquire an angle between the first panel and the second panel;

determine whether the angle between the first panel and the second panel is smaller than a threshold;

determine coordinates of the information input operation relative to the touch panel, according to the variation of shadow of the information input operation blocking the collimated light beams, after the variation of shadow is acquired, when the angle between the first panel and the second panel is smaller than the threshold; and acquire, by the touch panel, the input information corresponding to the information input operation according to the coordinates of the information input operation relative to the touch panel.

6. The electronic device according to claim 5, wherein the information input operation is performed on the touch panel.

7. The method according to claim 1, wherein after the acquiring an angle between the first panel and the second panel, the method further comprises:

adjusting an emergence angle of the collimated light beams generated by the collimated light generator, according to the angle generated between the first panel and the second panel.

8. The apparatus according to claim 3, wherein the processor performs the program instructions to:

adjust an emergence angle of the collimated light beams generated by the collimated light beams generator, according to the angle between the first panel and the second panel.

9. The electronic device according to claim 5, wherein the processor performs the program instructions to adjust an emergence angle of the collimated light beams generated by the collimated light beams generator, according to the angle between the first panel and the second panel.

\* \* \* \* \*

UNITED STATES PATENT AND TRADEMARK OFFICE
CERTIFICATE OF CORRECTION

PATENT NO. : 9,880,668 B2
APPLICATION NO. : 14/229861
DATED : January 30, 2018
INVENTOR(S) : Xiang Shao It is certified that error appears in the above-identified patent and that said Letters Patent is hereby corrected as shown below:

In the Claims

In Column 10, Line 28, Claim 1, "a collimated light" should be --a collimated light generator--.

Signed and Sealed this
Third Day of July, 2018

Andrei Iancu
*Director of the United States Patent and Trademark Office*